United States Patent [19]

Hon

[11] 4,010,397
[45] Mar. 1, 1977

[54] FLASHLAMP TRIGGERING ARRANGEMENTS FOR PRESSURIZED GAS COOLED LASERS

[75] Inventor: David T. Hon, Los Angeles, Calif.

[73] Assignee: Hughes Aircraft Company, Culver City, Calif.

[22] Filed: Oct. 30, 1975

[21] Appl. No.: 627,419

[52] U.S. Cl. .................................. 315/57; 313/197; 313/201; 313/198; 315/70; 315/241 P; 315/330; 331/94.5 PE

[51] Int. Cl.² ..................... H01J 7/44; H01J 13/46; H01J 17/34; H01J 19/78

[58] Field of Search .............. 315/57, 70, 312, 330, 315/241 P, 344; 313/201, 208, 192, 197, 198; 331/94.1, 94.5 R, 94.5 P, 94.5 PE

[56] References Cited
UNITED STATES PATENTS

| 733,423 | 7/1903 | Von Recklinghausen | 313/201 |
|---|---|---|---|
| 2,432,219 | 12/1947 | Vang | 315/57 |
| 2,624,023 | 12/1952 | Noel et al. | 313/201 |
| 2,696,584 | 12/1954 | Lion et al. | 313/201 |
| 3,679,998 | 7/1972 | Dahlinger | 315/57 |
| 3,935,547 | 1/1976 | Riemersma et al. | 331/94.5 PE |

*Primary Examiner*—Saxfield Chatmon, Jr.
*Attorney, Agent, or Firm*—Paul M. Coble; W. H. MacAllister

[57] ABSTRACT

Series and shunt flashlamp triggering arrangements are disclosed wherein an electrically conductive patch is intimately bonded to a portion of the outer lateral surface of the flashlamp housing extending over a portion of the high voltage electrode and terminating at a longitudinal location along the housing substantially aligned with the inner end of the high voltage electrode. An electrically conductive wire connected to the patch extends along the outer lateral surface of the housing from the patch to at least the vicinity of the other electrode. The high voltage electrode defines a sharp-edged annular rim projecting outwardly from its lateral surface adjacent its inner end.

8 Claims, 4 Drawing Figures

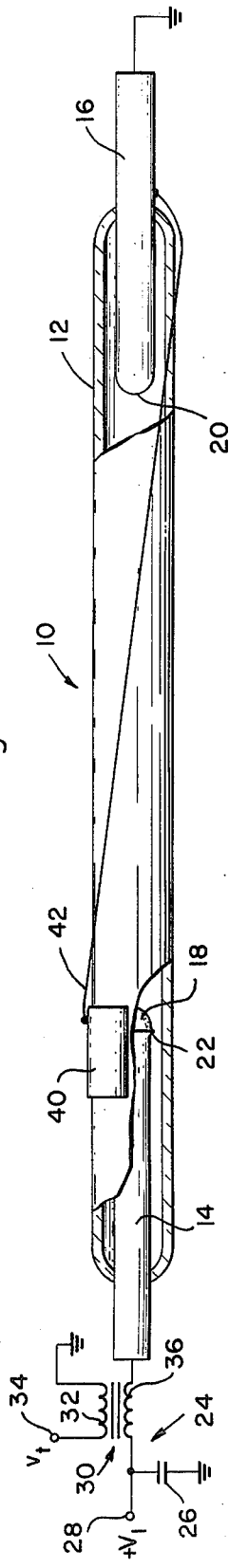
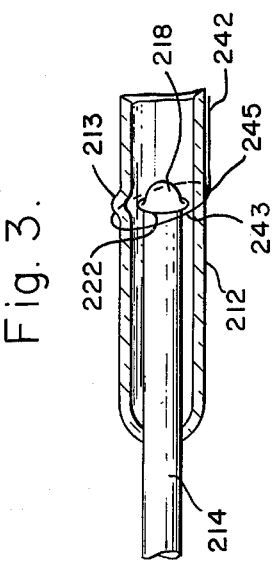
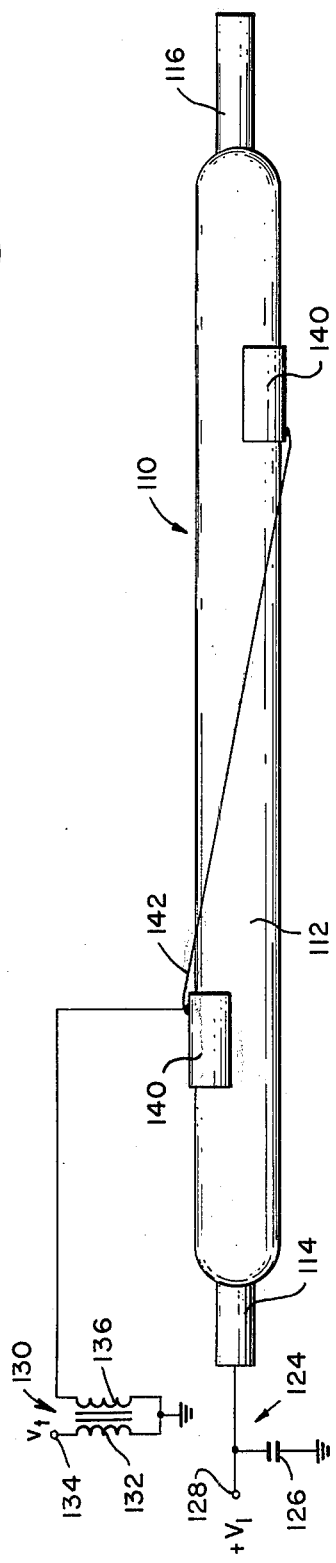

FLASHLAMP TRIGGERING ARRANGEMENTS FOR PRESSURIZED GAS COOLED LASERS

The invention herein described was made in the course of or under a contract or subcontract thereunder with the United States Army.

This invention relates generally to laser excitation, and more particularly relates to flashlamp triggering arrangements especially suitable for use with pressurized gas cooled lasers.

Prior art schemes for triggering laser flashlamps have included both series and shunt triggering arrangements. In series triggering, the triggering pulse (which ionizes the gas within the flashlamp) is applied directly to an electrode of the flashlamp, for example by means of a trigger transformer having its secondary winding connected in series with the flashlamp electrodes. Since with series triggering arrangements the transformer secondary winding provides a return path for flashlamp discharge current, the transformer must be designed to handle a relatively large current, thereby adding to the size, weight and expense of the transformer. Moreover, since some flashlamps require triggering voltages of 25 kv or more, electrical leads between the transformer secondary and the flashlamp electrodes must be insulated to withstand voltages of this magnitude in order to insure against arcing between the flashlamp leads and the laser pumping cavity.

In shunt triggering arrangements of the prior art, the gas within the flashlamp is initially ionized by an electric field generated from current flow in either a triggering wire wound about the outer surface of the flashlamp housing or in an electrically conductive strip longitudinally disposed along and bonded to the outer surface of the flashlamp housing. The triggering wire or strip is connected to the secondary winding of a trigger transformer.

A problem with the conductive strip triggering arrangements is that the average power of the flashlamp must be kept low to avoid thermal destruction of the strips. On the other hand, while the triggering wire windings are thermally durable, flashlamp triggering is readily inhibited when such arrangements are used in lasers wherein a high pressure gaseous coolant (such as nitrogen at a pressure of about 20 atmospheres) flows past the flashlamp housing. The reason for this is that the high pressure gas, with its significantly increased breakdown voltage, effectively electrically insulates the flashlamp electrodes from the triggering wire. The small contact area between the wire and the flashlamp housing is generally insufficient electrically, without the help of arcing, to establish an electric field in the vicinity of the lamp electrodes strong enough to initiate breakdown of the gas within the flashlamp. In addition, flashlamps used in lasers with high pressure gaseous coolants must be processed by firing the lamps backwards for a few hours so that sufficient metallic debris accumulates on the inner surfaces of the respective flashlamp housings to enable the initiation of arc discharges.

An improved flashlamp triggering arrangement is disclosed in U.S. Pat. No. 3,679,998, issued July 25, 1972 to R. J. Dahlinger and assigned to the assignee of the present invention. In the arrangement disclosed in this patent the trigger transformer includes a spool-like ceramic core which defines along its axis an elongated laser cavity in which the laser rod and the flashlamp are mounted. A primary winding and a plurality of secondary windings are coaxially wound about the core at different radial locations, with the secondary winding disposed radially inwardly of the primary winding and with an electrical conductor interconnecting the longitudinally opposite ends of each pair of successive secondary windings. A layer of plastic is disposed between each secondary winding and the adjacent interconnecting conductor and between the outermost secondary winding and the primary winding, while epoxy resin potting surrounds the primary and secondary windings and the interconnecting conductors.

Although the aforedescribed transformer arrangement eliminates the need for conductive strips or wires on the outer surface of the flashlamp housing, nevertheless a custom-made transformer is required. Also, since the transformer is located proximate to the laser cavity, it utilizes space which otherwise could be available for the laser cooling system. In addition, processing of the flashlamps by firing them backwards is still required for high pressure gas cooled systems.

It is an object of the present invention to provide a flashlamp triggering arrangement, especially suitable for use with pressurized gas cooled lasers, which is highly reliable and durable and which is operable with a small, inexpensive trigger transformer removed from the laser cavity region.

It is a further object of the invention to provide a laser flashlamp triggering arrangement which does not require backward prefiring of the flashlamp.

A triggering arrangement according to the invention is used with a flashlamp having an elongated substantially tubular dielectric housing containing an ionizable gas and a pair of spaced coaxially aligned substantially cylindrical electrodes disposed within the housing at opposite ends thereof. The triggering arrangement includes an electrically conductive patch in (intimate) contact with a portion of the outer lateral surface of the housing extending over a portion of the electrode to which a high voltage is applied and terminating at a longitudinal location along the housing substantially aligned with the inner end of the high voltage electrode. An electrically conductive wire is electrically connected to the patch and extends along the outer lateral surface of the housing from the patch to at least the vicinity of the other electrodes. A dc voltage is applied between the flashlamp electrodes, and a trigger voltage is applied between the high voltage electrode and the patch.

Additional objects, advantages and characteristic features of the present invention will become apparent from the following detailed description of preferred embodiments of the invention when considered in conjunction with the accompanying drawing wherein:

FIG. 1 is a longitudinal side view, partly broken away and partly in circuit schematic form, illustrating a flashlamp series triggering arrangement in accordance with one embodiment of the invention;

FIG. 2 is a longitudinal side view, partly in circuit schematic form, showing a flashlamp shunt triggering arrangement in accordance with another embodiment of the invention;

FIG. 3 is a sectional view illustrating a portion of an arrangement according to a further embodiment of the invention at an intermediate stage of manufacture; and FIG. 4 is a perspective view illustrating a spring clip member used in still another embodiment of the invention.

Referring to FIG. 1 with greater particularity, there is shown a flashlamp 10 having an elongated tubular housing 12 of a dielectric material such as quartz. A pair of substantially cylindrical electrodes 14 and 16 are coaxially disposed at opposite ends of the housing 12 and extend both internally and externally of the housing 12, with the ends of the housing 12 being hermetically sealed to the electrodes 14 and 16. The interior of the housing 12 is filled with a suitable ionizable gas such as krypton or xenon.

The electrodes 14 and 16 define rounded surfaces 18 and 20 at their respective ends facing one another. Electrode 14 additionally defines a sharp-edged annular rim 22 projecting outwardly from the lateral surface of electrode 14 a short distance from the rounded end 18. As a specific illustrative example, for an electrode diameter of 3 mm, rim 22 may be located 2 mm from the tip of end 18 and may project outwardly from the lateral surface of electrode 14 for a distance of about ½ to 1 mm. The knife-like rim 22 lowers the voltage required to trigger the flashlamp 10 sufficiently so that processing of the flashlamp 10 by firing it backwards is not required.

In the series triggering arrangement of FIG. 1 electrode 14 is connected to a pulse-forming network 24, while electrode 16 is connected to a level of reference potential illustrated as ground. Pulse-forming network 24 includes a capacitor 26 connected between a power supply terminal 28 furnishing a dc voltage $+V_1$ and the ground level. A step-up trigger transformer 30 has its primary winding 32 connected between an input terminal 34 and ground and has its secondary winding 36 connected between power supply terminal 28 and flashlamp electrode 14. Input terminal 34 receives a trigger voltage $v_t$ in the form of a negative spike. As a specific illustrative example, the voltage $V_1$ may be around 1,000 volts, with the trigger voltage $v_t$ and the transformer turns ratio selected to provide about 3–5 kv across the secondary winding 36.

An electrically conductive patch 40 is disposed in intimate contact with a portion of the outer lateral surface of the flashlamp housing 12 adjacent to the inner portion of electrode 14. The patch 40 extends over only a portion of the electrode 14 and terminates at a longitudinal location along the housing 12 substantially aligned with the tip of electrode end portion 18. It is important that the patch 40 not project over the region between the electrodes 14 and 16; however, its extent in the opposite direction, i.e. toward the near end of the housing 12, is not critical. Moreover, the patch 40 preferably extends circumferentially approximately halfway around the housing 12. As a specific illustrative example, for a housing outer diameter of 0.25 inch, patch 40 may have a circumferential extent of about 0.4 inch and extend longitudinally along housing 12 for about 0.25 inch.

Intimate contact between patch 40 and housing 12 may be made by a variety of techniques including but not limited to vacuum deposition, painting, soldering, electroplating and magnetoforming. In one embodiment of the invention the patch 40 is vacuum deposited onto the outer surface of the housing 12. A vacuum deposited patch 40 preferably consists of three layers: an inner layer providing a good conductor-to-dielectric bond, a middle layer consisting of the primary conductive material itself, and an outer layer protecting the conductive material against oxidation. As a specific illustrative example, the inner layer may be of a nickel-chromium alloy, the middle layer of aluminum, and the outer layer of nickel, with exemplary thicknesses of 0.01 $\mu$m, 2.0 $\mu$m and 0.1 $\mu$m, respectively.

After the patch 40 has been deposited onto the housing 12, a conductive wire 42 is connected between the patch 40 and the electrode 16 at the opposite end of the flashlamp 10. For the aforementioned specific exemplary vacuum deposited patch 40, wire 42 may be of a gold-plated nickel-chromium alloy and have a diameter of about 5 mils. Preferably, wire 42 is attached to the patch 40 and the electrode 16 at circumferentially opposite points around housing 12 so that the wire makes one-half of a spiral turn about the lateral surface of the housing 12. When the conductive patch 40 is vacuum deposited onto the housing 12, wire 42 may be attached to both the patch 40 and the electrode 16 by means of a soft solder.

An alternate embodiment of the invention, providing a shunt triggering arrangement, is illustrated in FIG. 2. Components in the embodiment of FIG. 2 which correspond to respective components in the embodiment of FIG. 1 are designated by the same second and third reference numeral digits as their counterpart components in FIG. 1, along with the addition of a prefix numeral 1. The arrangement of FIG. 2 differs from that of FIG. 1 in that power supply terminal 128 is connected directly to flashlamp electrode 114, and trigger transformer 130 has its secondary winding 136 connected between conductive patch 140 adjacent to flashlamp electrode 114 and ground. Moreover, a second electrically conductive patch 140 is provided in intimate contact with a portion of the outer lateral surface of housing 112 extending over the other flashlamp electrode 16, and wire 142 is connected between the two patches 140. However, a sharp-edged rim such as 22 need be provided only on electrode 114.

As has been indicated above, conductive patches 40 and 140 can be formed by a number of different techniques. In accordance with a further embodiment of the invention, illustrated in FIG. 3, the conductive patch or patches are formed of silver paint. Components in the embodiment of FIG. 3 which correspond to respective components in the embodiment of FIG. 1 are designated by the same second and third reference numeral digits as their counterpart components in FIG. 1, along with the addition of a prefix numeral 2. In the embodiment of FIG. 3 flashlamp housing 212 is provided with a protuberance 213 adjacent to electrode end portion 218. Wire 242 is formed into a loop 243 extending around the surface of housing 212 on the side of protuberance 213 closer to the near end of the housing 212 and connected by means of a soft solder joint 245. The conductive patch (not shown) is then formed by painting a single layer of silver epoxy on a portion of the surface of housing 212 adjacent loop 243 and so that the painted layer makes electrical connection with the loop 243. The embodiment of FIG. 3 is suitable for use with relatively low power laser flashlamps.

In accordance with a still further embodiment of the invention, electrically conductive patches 40 or 140 are formed from a spring clip member 50 shown in FIG. 4. The member 50 may be made from a strip of flat spring steel (for example, 10–15 mils thick and 40 mils wide) wound into a spiral having an inner diameter slightly smaller than the outer diameter of the associated flashlamp housing. The member 50 is electroplated with copper, after which it is coated with leadindium or other low melting point alloy. The member 50 is then squeezed onto the flashlamp housing at its desired location extending over the inner end region of the high voltage flashlamp electrode. The combined structure is then heated to a temperature which enables the member 50 to shrink into conformity with the underlying outer surface of the housing 12 and thereby ensure intimate contact therewith. The spring clip arrangement of FIG. 4 is especially suitable for use with laser flashlamp operating at relatively high power levels.

In arrangements according to the invention intimate contact is established between a conductive patch on the outer lateral surface of the flashlamp housing and a portion of the flashlamp housing extending over a portion of the high voltage flashlamp electrode, and the surface of the housing projecting over the space between the electrodes is left free from conductive material except for a loosely lying conductive wire. The small area of intimate contact near the high voltage electrode is sufficient to commence a discharge within the flashlamp, and once commenced, the loosely lying wire is adequate to complete the discharge by ushering it down the length of the flashlamp to the other electrode. Since the conductive patch makes intimate contact with only a relatively cool portion of the flashlamp housing, high thermal durability is achieved. Also, a small and inexpensive trigger transformer may be employed at a location removed from the laser cavity region. In addition, no backward prefiring of the flashlamp is required. Thus, the present invention is able to provide a highly reliable, durable, simple and inexpensive flashlamp triggering arrangement.

Although the invention has been shown and described with reference to particular embodiments, nevertheless various changes and modifications which are obvious to a person skilled in the art to which the invention pertains are deemed to lie within the spirit, scope and contemplation of the invention.

What is claimed is:

1. In combination with a flashlamp having an elongated substantially tubular hermetically sealed housing of dielectric material, an ionizable gas within said housing, and first and second spaced coaxially aligned substantially cylindrical electrodes disposed within said housing at opposite ends thereof, each of said first and second electrodes having a rounded end facing the other of said electrodes, a triggering arrangement comprising:
    an electrically conductive patch in intimate contact with a portion of the outer lateral surface of said housing extending over a portion of said first electrode and terminating at a longitudinal location along said housing substantially aligned with the inner end of said first electrode, said first electrode defining a sharp-edged annular rim projecting outwardly from its lateral surface adjacent to said end, an electrically conductive wire electrically connected to said patch and extending along the outer lateral surface of said housing from said patch to at least the vicinity of said second electrode, and means for applying a dc voltage between said first and second electrodes and a trigger voltage between said first electrode and said patch.

2. The combination of claim 1 wherein said patch includes a spring member shrunk onto said portion of said housing surface.

3. The combination of claim 2 wherein said spring member consists of a spiral-wound strip.

4. The combination of claim 3 wherein said strip is of steel.

5. In combination with a flashlamp having an elongated substantially tubular hermetically sealed housing of dielectric material, an ionizable gas within said housing, and first and second spaced coaxially aligned substantially cylindrical electrodes disposed within said housing at opposite ends thereof, each of said first and second electrodes having a rounded end facing the other of said electrodes, a triggering arrangement comprising:
    an electrically conductive patch in intimate contact with a portion of the outer lateral surface of said housing extending over a portion of said first electrode and terminating at a longitudinal location along said housing substantially aligned with the inner end of said first electrode, said first electrode defining a sharp-edged annular rim projecting outwardly from its lateral surface adjacent to said end, an electrically conductive wire extending along the outer lateral surface of said housing and electrically connected to said patch and to said second electrode, first and second power supply terminals, said second power supply terminal being coupled to said second electrode, a capacitor coupled between said first and second power supply terminals, a transformer having a primary winding and a secondary winding, said secondary winding being coupled between said first power supply terminal and said first electrode, and means for applying a trigger voltage across said primary winding.

6. In combination with a flashlamp having an elongated substantially tubular hermetically sealed housing of dielectric material, an ionizable gas within said housing, and first and second spaced coaxially aligned substantially cylindrical electrodes disposed within said housing at opposite ends thereof, each of said first and second electrodes having a rounded end facing the other of said electrodes, a triggering arrangement comprising:
    a first electrically conductive patch in intimate contact with a first portion of the outer lateral surface of said housing extending over a portion of said first electrode and terminating at a longitudinal location along said housing substantially aligned with the inner end of said first electrode, said first electrode defining a sharp-edged annular rim projecting outwardly from its lateral surface adjacent to said end, a second electrically conductive patch in intimate contact with a second portion of the outer lateral surface of said housing extending over a portion of said second electrode and terminating at a longitudinal location along said housing substantially aligned with the inner end of said second electrode, an electrically conductive wire extending along the outer lateral surface of said housing between said first and second patches and electrically connected to said first and second patches, a first power supply terminal coupled to said first electrode, a second power supply terminal coupled to said second electrode, a capacitor coupled between said first and second power supply terminals, a transformer having a primary winding and a secondary winding, said secondary winding being coupled between said first patch and said second power supply terminal, and means for applying a trigger voltage across said primary winding.

7. In combination with a flashlamp having an elongated substantially tubular hermetically sealed housing of dielectric material, an ionizable gas within said housing, and first and second spaced coaxially aligned substantially cylindrical electrodes disposed within said housing at opposite ends thereof, a triggering arrangement comprising:
an electrically conductive patch in intimate contact with a portion of the outer lateral surface of said housing extending over a portion of said first electrode and terminating at a longitudinal location along said housing substantially aligned with the inner end of said first electrode, an electrically conductive wire electrically connected to said patch and extending along the outer lateral surface of said housing from said patch to at least the vicinity of said second electrode, said electrically conductive wire being disposed such that it makes substantially one-half of a spiral turn about the outer lateral surface of said housing, and means for applying a dc voltage between said first and second electrodes and a trigger voltage between said first electrode and said patch.

8. In combination with a flashlamp having an elongated substantially tubular hermetically sealed housing of dielectric material, an ionizable gas within said housing, and first and second spaced coaxially aligned substantially cylindrical electrodes disposed within said housing at opposite ends thereof, a triggering arrangement comprising:
an electrically conductive patch in intimate contact with a portion of the outer lateral surface of said housing extending over a portion of said first electrode and terminating at a longitudinal location along said housing substantially aligned with the inner end of said first electrode, said patch extending approximately halfway around the circumference of said housing, an electrically conductive wire electrically connected to said patch and extending along the outer lateral surface of said housing from said patch to at least the vicinity of said second electrode, and means for applying a dc voltage between said first and second electrodes and a trigger voltage between said first electrode and said patch.

* * * * *